United States Patent [19]

Kardol et al.

[11] 4,004,060

[45] Jan. 18, 1977

[54] BINDING AGENTS

[75] Inventors: Arie Dick Kardol, Waddinxveen; Johannes Helmond, Gouda, both of Netherlands

[73] Assignee: Emery Industries, Inc., Cincinnati, Ohio

[22] Filed: Aug. 4, 1975

[21] Appl. No.: 601,582

Related U.S. Application Data

[62] Division of Ser. No. 499,813, Aug. 23, 1974, Pat. No. 3,959,196.

[52] U.S. Cl. .................... 428/290; 162/164 EP; 427/395; 427/421; 428/413; 428/537

[51] Int. Cl.² ................. B32B 27/02; B32B 27/10

[58] Field of Search ............. 260/29.2 EP, 18 EP, 260/47 EQ; 428/290, 413, 537; 427/395, 421; 162/164 EP

[56] References Cited

UNITED STATES PATENTS

| | | | |
|---|---|---|---|
| 2,970,983 | 2/1961 | Newey | 260/18 EP |
| 3,280,056 | 10/1966 | Masters | 260/18 EP |
| 3,449,281 | 6/1969 | Sullivan et al. | 260/29.2 EP |
| 3,471,421 | 10/1969 | Vegter et al. | 260/18 EP |
| 3,507,819 | 4/1970 | Vegter et al. | 260/18 EP |

FOREIGN PATENTS OR APPLICATIONS

| | | | |
|---|---|---|---|
| 684,221 | 4/1964 | Canada | 260/29.2 EP |
| 569,227 | 1/1959 | Canada | 260/18 EP |
| 1,039,793 | 8/1966 | United Kingdom | 260/29.2 EP |

*Primary Examiner*—James J. Bell
*Attorney, Agent, or Firm*—Gerald A. Baracka; John D. Rice

[57] ABSTRACT

This invention provides certain complex molecules which possess excellent solubility in water and excellent reactivity making them useful in the manufacture of non-woven products and processes for their preparation. The compositions are comprised of structural units derived from a higher polycarboxylic acid and about one mole of a di-epoxide per carboxyl group, about 0.5 to 1.5 moles of an alkoxy polyoxyalkylene compound and about 0.5 to 1.5 moles of an alkanolamine neutralized with a lower monocarboxylic acid.

3 Claims, No Drawings

BINDING AGENTS

This is a division of application Ser. No. 499,813, filed August 23, 1974 now U.S. Pat. No. 3,959,196.

BACKGROUND OF THE INVENTION

This invention relates to binding agents which are water soluble and suitable for use in the manufacture of non-woven products such as felts, papers and interlinings.

Binding agents consisting of compounds with diverse structural units are known in the art. However, these compounds are not generally satisfactory since they do not show the desired balance of properties consisting of:

A. Solubility in water. Solubility or dispersibility in water obviates the use of organic solvents, which are objectionable from the points of view of environment, hazard and cost.

B. Imparting of flexibility. The end product, a non-woven product or coating should be flexible in order to be long lasting and to maintain good products.

C. Reactivity. Ability to react with epoxy, hydroxyl and carboxyl groups enables the binding agent to be chemically bonded to other materials, e.g. fibers, and also improves surface adhesion.

SUMMARY OF THE INVENTION

We have now discovered certain complex molecules having a center (Nucleus) consisting of a polycarboxylic acid, to each carboxylic group of which a diepoxide has been attached of which part of the terminal epoxide groups bear alkoxy polyoxyalkylene groups and dialkanol ammonium groups which are neutralized by carboxylate ions derived from a lower carboxylic acid. The compositions of this invention are derived from a higher polycarboxylic acid and about one mole of a di-epoxide per carboxyl group, about 0.5 to 1.5 moles of an alkoxy polyoxyalkylene compound, about 0.5 to 1.5 moles of an alkanolamine containing nitrogen atoms which have been reacted with a lower monocarboxylic acid to a product having a pH value of 4–9, preferably from 6–8. These products possess excellent solubility in water and excellent reactivity while at the same time imparting good flexibility to the end product.

DETAILED DESCRIPTION

The binding agents of this invention are derived from a higher polycarboxylic acid, a diepoxide, an alkoxy polyoxyalkylene compound and an alkanolamine as herein described. The higher polycarboxylic acid contains two to four carboxyl groups and 30–80 carbon atoms per molecule. The carboxyl groups are preferably separated by a hydrocarbon chain and are not located on adjacent carbon atoms. A particularly preferred group of polycarboxylic acids are the dimer, trimer and high oligomer fractions obtained by the polymerization of unsaturated $C_{16} - C_{20}$ fatty acids. These polymer acids may optionally be hydrogenated. Carbon contents of these molecules range from 30 to 80 and preferably from 35 to 60 carbon atoms.

The diepoxides which can be used for the purpose of this invention are preferably alpha-omega-diepoxy compounds containing 5 to 50 carbon atoms in the molecule. More particularly diglycidyl ethers of compounds such as p,p'-dihydroxydiphenyldimethylmethane (Bisphenol A), p,p'-dihydroxydiphenylmethane (Bisphenol F), and polyoxypropylene glycols can be used.

Alkoxy polyoxyalkylene compounds which can be used for the purpose of this invention preferably carry terminal hydroxyl and alkoxy groups. The alkylene groups will contain 2 or 3 carbon atoms. Especially useful are monoalkoxypolyoxyethylene glycols and monoalkoxypolyoxypropylene glycols having molecular weights from 200 to 500. A suitable compound is derived from methanol to which an average seven ethylene oxide units have been added.

The alkanolamines which can be used for the purpose of this invention contain 2 or 3 carbon atoms in the alkanol group, such as monoethanolamine and diethanolamine. The dialkanolamines are especially useful for this invention, however, polyalkoxylated compounds can be used as well. The amine nitrogen atoms are furthermore partly neutralized by reacting with a lower, i.e. $C_1 - C_4$, monocarboxylic acid.

The binding agents of this invention are conveniently prepared by coupling the polycarboxylic acid with the diepoxide in the presence of a metal catalyst such as lithium naphthenate, at a temperature of 120°–180° C. A solvent such as e.g. diacetonealcohol, butyl "Cellosolve" or the like may be advantageous. After the first reaction the product is further reacted with the alkoxy polyoxyalkylene compound and then further with the alkanolamine followed by neutralization with a lower monocarboxylic acid. To obtain the compositions of this invention the polycarboxylic acid is reacted with about 1 mole of the di-epoxide per carboxylic group, about 0.5 to 1.5 moles of the alkoxy polyoxyalkylene compound, 0.5 to 1.5 moles of the alkanolamine and sufficient lower monocarboxylic acid so the product has a pH of 4–9, preferably, 6–8.

The binding agents described above can be used as such in the manufacture of non-woven products and after curing at elevated temperatures the binding material still remains flexible. It is preferred to use the binding agents of this invention in combination with other resinous compositions such as low molecular weight melamine formaldehyde resins, epoxy polyamide systems and polyvinyl acetate dispersions. These may be used together with this cross-linking agent. The binding agents of this invention, or a combination thereof with a resin, can be applied by adding the material to the substrate, e.g. to fibers, or by spraying them optionally in an aqueous solution on - the substrate, and then curing, preferably by heat- and/or press-curing. Whereas the relative amounts of the various components in the binding agent system may vary widely, the amount of binding agent, based on the weight of the substrate, is usually within the range of 3 – 40% by weight depending of course on the amounts of reactive groups they contain.

The following Examples illustrate the invention more fully.

EXAMPLE I

In a four-necked, round-bottomed 4 liter flask, provided with a water-cooled condenser, a stirrer, a thermometer and a gas inlet tube for the introduction of an inert gas, 840 g (1 mole) trimeric fatty acids, containing at least 85% by weight of trimer ($C_{54}$) and higher polymeric fatty acids, 1128 g (3 moles) of an epoxy resin based on the diglycidyl ether of Bisphenol A (Epikote 828), 500 g monobutoxy glycol (butyl "Cellosolve") and 11.2 g lithium naphthenate were heated to 150° C while being stirred and while an inert gas was being introduced. When the acid value decreased to 1, 340 g (1 mole) ethoxylated methanol (CH₃OH.7C₂H₄O) were added and the reaction continued at 150° C until the oxirane value decreased to 1.1. The hydroxyl value was then 245. The temperature was then lowered to 120°–130° C and 105 g (1 mole) diethanolamine added and the reaction continued at 120° C until the hydroxyl value decreased to 255. Finally the mixture was cooled to 50°–60° C and 60 g (1 mole) acetic acid were added. The end product thus obtained gave a very stable dispersion in water and had the following analytical values: acid value 16.9; hydroxyl value 250 determined according to Dutch Standardized Method NEN 1046; viscosity of 25° C 16,000 cp; oxirane value 0.5% active oxygen. The pH of a 10% aqueous solution was 4.58. For comparison, the theoretical values for this reaction mixture and the products described in Examples II–VI: acid value 18.0; oxirane value 0.54; hydroxyl value 249 (in Example II hydroxyl value = 170).

EXAMPLE II

Following the same procedure as described in Example I, but using 840 g (1.5 moles) polymeric fatty acids, having a typical composition of 1% monomeric (C₁₈), 95% dimeric (C₃₆) and 4% trimeric (C₅₄) fatty acids instead of trimeric fatty acid a product was prepared having the following analytical data: acid value 19, hydroxyl value 230, oxirane value 0.45, viscosity at 25° C 21,300 cps. The pH of a 10 percent aqueous dispersion was 4.7. The product gave a very stable dispersion in water.

EXAMPLE III

By the same procedure as described in Example I, however, with 500 g ethyl "Cellosolve" acetate as solvent instead of butyl "Cellosolve" a product was made having the following analytical values: acid value 17.5; hydroxyl value 181 (indicating incomplete conversion); oxirane value 0.6; viscosity of 25° C 6,650 cp. In water the product gave a less stable dispersion than the product of Example I.

EXAMPLE IV

By the procedure of Example I, a water-soluble binding agent was made from 840 g trimer acid (1 mole), 1128 g (3 moles) the diglycidyl ether of Bisphenol F, 340 g (1 mole) ethoxylated methanol and 105 g (1 mole) diethanolamine using 500 g butyl "Cellosolve" and 11.2 g lithium naphthenate as catalyst. Finally the product was neutralized with 60 g (1 mole) acetic acid. The end product was water-soluble and had the following analytical values: acid value 18.1; oxirane value 0.4; hydroxyl value 246; viscosity at 225° C 10,800 cp.

EXAMPLE V

The procedure described in Example III was repeated, but now with an equal amount by weight of a diglycidyl ether of polyoxypropylene glycol. The end product was water soluble and had as analytical values; acid 18.3; oxirane value 0.5; hydroxyl value 245; and a viscosity at 25° C of 1,020 cp.

EXAMPLE VI

The product described in Example IV was repeated according to the method described in Example I using as the polycarboxylic acid 50% by weight trimer acid (Empol 1040) and 50% by weight dimer acid (Empol 1022, which besides a few percent monomeric acid, contains approx. 20% trimeric acid). The end product gave a very stable dispersion in water and had the following analytical values; acid value 19; hydroxyl value 246; oxirane value 0.5; and a viscosity at 25° C 825 cp.

EXAMPLE VII

A product based on the starting materials of Example IV was made according to the procedure described in Example I using dimeric acid containing approx. 20% by weight of trimeric acid. The end product, as expected; had a fairly low viscosity, and gave a very stable dispersion in water. The analytical values were: acid value 18.6; hydroxyl value 253; oxirane value 0.5; viscosity at 25° C 610 cp.

EXAMPLE VIII

A product based on the starting materials of Example VI was made according to the procedure described in Example I, however, without solvent. The end product was dispersible in water and had as analytical values: acid value 20; hydroxyl value 202; oxirane value 0.6; and a viscosity at 25° C of 12,950 cp.

EXAMPLE IX

According to the procedure described in Example I, 840 g trimer acid and 2280 g (6 moles) of the diglycidyl ether of polyoxypropylene glycol were reacted at 150° C under the influence of lithium naphthenate catalyst until the acid value decreased to 1. At 120°–130° C the mixture was then reacted with 105 g (1 mole) diethanolamine and finally the product neutralized at 50°–60° C with 60 g (1 mole) acetic acid. The product thus obtained, still containing many reactive epoxy groups, dissolved to a clear solution in water and had as analytical values: acid value 12.3; oxirane value 4.0 and a viscosity of 25° C of 7,750 cp.

EXAMPLE X

According to the procedure described in Example I, 840 g trimeric acid (Empol 1040) was reacted with a mixture of 1128 g (3 moles) diglycidyl ether of Bisphenol A and 1140 g (3 moles) diglycidyl ether of polyoxypropylene glycol in the presence of 500 g butyl "Cellosolve" and 2.4 lithium naphthenate catalyst of 150° C until the acid value decreased to 1. 105 g (1 mole) diethanolamine were added at 120° C and the reaction continued. Finally the product was neutralized at 50° C with 60 g (1 mole) acetic acid. The end product, which contained a considerable number of reactive epoxy groups, was soluble in water and had as analytical values: acid value 12.6; oxirane value 3.2; and a viscosity at 25° C of 1820 cp.

EXAMPLE XI

A cardboard-like paper was prepared by suspending in water bisulphite-bleached cellulose fibers. The slurry was poured on a Buchner funnel and the water sucked off by application of vacuum. The wet round sheet of paper was sprayed with an aqueous solution of the product prepared according to Example I, a cross-linking polyvinyl acetate (d.n. 125–2828 ex Delft National, The Netherlands), together with a glycolic acid catalyst (weight ratio 10 : 90 : 6) and the paper press-cured for 15 minutes at 130° C. An excellent cardboard-like paper was obtained.

In order to evaluate the properties of the binding agent system, a thin coating of the material was applied on glass, cured and the properties evaluated as described below.

To demonstrate the effect on flexibility mixtures of the product of Example I and Example II and crosslinking polyvinyl acetate, containing a monomeric material with reactive groups such as carboxyl and hydroxyl groups, were cured with 3% glycolic acid catalyst at 130 = 1° C in a vented oven for 15 minutes with the resulting comparative hardness values listed below.

| Weight ratio of Compound of Example to polyvinyl-acetate | 0/100 | 10/90 | 20/80 | 30/70 |
|---|---|---|---|---|
| Compound of Ex. I | 198 | 135 | 90 | 37 |
| Compound of Ex. II | 198 | 104 | 64 | 39 |

Hardness according to König in seconds.

In similar tests cardboard papers were prepared and the performance of the binding agent tested.

EXAMPLE XII

In a similar way as described in Example X cardboard paper was prepared. To test the influence on flexibility of the products of Example I, II, and VI and a methoxylated melamine-formaldehyde resin (Maprenal WL-hexakis methoxymethyl melamine) mixtures were cured with 2% of paratoluene sulphonic acid as a catalyst at 150° C for 30 minutes. Miscibility and water absorption of the films were also tested.

|  | 100 Resin | Example I/ Resin 70/30 | Example II/ Resin 70/30 | Example VI/ Resin 70/30 |
|---|---|---|---|---|
| Miscibility with water | — | good | good | good |
| Hardness | more than 200 sec. | 121 | 124 | 36 |
| Water absorption | — | 1.1% | 1.4% | 1.5% |

Hardness according to König in seconds.
Water absorption: 24 hours immersion of the film in water at 23° C.

We claim:
1. A non-woven article comprising a substrate treated with an aqueous solution or dispersion of a binding agent and cured, said binding agent being present in an amount from about 3 to 40% by weight of the substrate and obtained by reacting (a) a dimer, trimer or higher oligomer obtained from the polymerization of unsaturated $C_{16}$–$C_{20}$ fatty acids with (b) one mole (per carboxyl group) of a diglycidyl ether compound selected of the group consisting of Bisphenol A, Bisphenol F and polyoxypropylene glycol, further reacting (c) about 0.5 to 1.5 mols of an alkoxy polyoxyalkylene compound having terminal alkoxy and hydroxyl groups, a molecular weight from about 200 to 500 and alkylene groups containing 2 or 3 carbon atoms and (d) 0.5 to 1.5 mols of an alkanol amine the alkanol groups of which contain 2 or 3 carbon atoms and finally neutralizing to a pH of 4–9 with a (e) monocarboxylic acid containing 1 to 4 carbon atoms.
2. The non-woven article of claim 1 wherein the aqueous solution or dispersion of binding agent is sprayed onto the substrate.
3. The non-woven article of claim 2 wherein the binding agent is employed in conjunction with a resin selected from the group consisting of low molecular weight melamine-formaldehyde, epoxy polyamide and polyvinyl acetate.

* * * * *